United States Patent
Prats

(10) Patent No.: US 9,682,476 B1
(45) Date of Patent: Jun. 20, 2017

(54) SELECTING ROBOT POSES TO ACCOUNT FOR COST

(71) Applicant: X Development LLC, Mountain View, CA (US)

(72) Inventor: Mario Prats, Palo Alto, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 27 days.

(21) Appl. No.: 14/724,178

(22) Filed: May 28, 2015

(51) Int. Cl.
G05B 19/04 (2006.01)
B25J 9/16 (2006.01)

(52) U.S. Cl.
CPC ... B25J 9/1664 (2013.01); *G05B 2219/40465* (2013.01); *Y10S 901/02* (2013.01); *Y10S 901/46* (2013.01)

(58) Field of Classification Search
CPC .......... B25J 9/1664; G05B 2219/40465; Y10S 901/02; Y10S 901/46
See application file for complete search history.

(56) References Cited

U.S. PATENT DOCUMENTS

| | | | |
|---|---|---|---|
| 4,638,445 A | 1/1987 | Mattaboni | |
| 4,786,847 A | 11/1988 | Daggett et al. | |
| 5,303,384 A | 4/1994 | Rodriguez et al. | |
| 5,908,458 A | 6/1999 | Rowe et al. | |
| 5,946,673 A | 8/1999 | Francone et al. | |
| 6,341,246 B1 | 1/2002 | Gerstenberger et al. | |
| 6,526,373 B1 | 2/2003 | Barral | |
| 7,211,980 B1 | 5/2007 | Bruemmer et al. | |
| 7,802,193 B1 | 9/2010 | McDonald et al. | |
| 7,853,356 B2 | 12/2010 | Tsai et al. | |
| 7,908,405 B2 | 3/2011 | Yung et al. | |
| 8,060,251 B2 | 11/2011 | Gonzalez-Banos et al. | |
| 8,271,132 B2 | 9/2012 | Nielsen et al. | |
| 8,355,818 B2 | 1/2013 | Nielsen et al. | |
| 8,401,698 B2 | 3/2013 | Kamrani et al. | |
| 8,571,706 B2 | 10/2013 | Zhang et al. | |
| 8,818,555 B2 | 8/2014 | Kim et al. | |
| 8,868,241 B2 | 10/2014 | Hart et al. | |
| 2005/0234592 A1 | 10/2005 | McGee et al. | |

(Continued)

OTHER PUBLICATIONS

Boularias et al.; Efficient Optimization for Autonomous Robotic Manipulation of Natural Objects, The robotics Institute, Canegie Mellon University, 2014, Pittsburgh, USA Jan. 1, 2014.
Park et al.; ITOMP: Incremental Trajectory Optimization for Real-time Replanning in Dynamic Environments; University of North Carolina; 2012; US Jan. 1, 2012.

(Continued)

*Primary Examiner* — Nicholas Kiswanto
(74) *Attorney, Agent, or Firm* — Middleton Reutlinger

(57) ABSTRACT

Methods, apparatus, systems, and computer-readable media are provided for selecting robot poses to account for cost. In various implementations, a plurality of candidate instruction sets may be determined. Each candidate instruction set may be configured to cause a robot to assume a different respective set of poses while traversing a reference point along a path. In various implementations, a cost incurred while the robot implements the candidate instruction set to traverse the reference point along the path may be calculated. A candidate instruction set associated with an incurred cost that satisfies a first criterion may be selected from the plurality of candidate instruction sets. In some implementations, the selected candidate instruction set and incurred cost may be associated with the path.

23 Claims, 6 Drawing Sheets

(56) References Cited

U.S. PATENT DOCUMENTS

| | | |
|---|---|---|
| 2006/0117324 A1 | 6/2006 | Alsafadi et al. |
| 2011/0106309 A1 | 5/2011 | Lim et al. |
| 2012/0215354 A1* | 8/2012 | Krasny .................. B25J 9/1666 700/255 |
| 2013/0096719 A1 | 4/2013 | Sanders et al. |
| 2013/0116828 A1 | 5/2013 | Krause et al. |
| 2013/0338827 A1* | 12/2013 | One .......................... B25J 9/10 700/252 |
| 2013/0343640 A1 | 12/2013 | Buehler et al. |
| 2014/0136302 A1 | 5/2014 | Song et al. |
| 2014/0188273 A1* | 7/2014 | Khoukhi .................. B25J 9/162 700/250 |
| 2014/0195054 A1 | 7/2014 | Kamiya |
| 2014/0214208 A1 | 7/2014 | Shimizu et al. |
| 2014/0324269 A1 | 10/2014 | Abramson et al. |
| 2015/0005622 A1 | 1/2015 | Zhao et al. |
| 2015/0045813 A1 | 2/2015 | Kostrzewski et al. |

OTHER PUBLICATIONS

Olson et al.; Mole2D—Part II: a case study; 2013; pp. 18-41 00 Jan. 2013.

Trivedi, Nishant, et al. "Communicating, Interpreting, and Executing High-Level Instructions for Human-Robot Interaction." AAAI Fall Symposium: Advances in Cognitive Systems. 2011, 8 pages.

Stilman, Mike. "Task constrained motion planning in robot joint space." Intelligent Robots and Systems, 2007. IROS 2007. IEEE/RSJ International Conference on. IEEE, 2007, pp. 3074-3081.

Haber Adam, Unsw Edu, and Claude Sammut. 'A Cognitive Architecture for Autonomous Robots.' 2013, pp. 257-275.

Brown S., & Sammut, C. (2011). Tool Use Learning in Robots. Proceedings of the 2011 AAAI, 8 pages.

Remy, C. David, Keith Buffinton, and Roland Siegwart. 'Comparison of cost functions for electrically driven running robots.' Robotics and Automation (ICRA), 2012 IEEE International Conference on. IEEE, 2012, pp. 2343-2350.

* cited by examiner

SELECTING ROBOT POSES TO ACCOUNT FOR COST

BACKGROUND

A robot may perform an assigned task in various manners. For example, the robot may have the option of traversing an end effector such as a claw or other tool along any one of multiple "candidate" paths between a first location and a second location in order to perform the task. Additionally, the robot may be able to perform various aspects of the tasks in a variety of configurations. For example, depending on the nature of an object to be moved, the robot may have the option to position a claw around the object from a variety of angles, any of which may be acceptable. Further, the robot may be able to strike any number of different sets of poses while performing the task. The paths, configurations, and poses available to the robot may be limited only by inherent constraints of the robot (e.g., its reach), environmental constraints (such as obstacles), and/or constraints associated with objects to be acted upon (e.g., is it permissible for the object to be tilted while moved?). However, depending on the paths, configurations and/or poses selected, the robot may experience a variety of costs, such as wear and tear, or excessive motion that may unnecessarily increase robot task execution time or endanger personnel near the robot.

SUMMARY

The present disclosure is generally directed to methods, apparatus, and computer-readable media (transitory and non-transitory) for selecting sets of poses for a robot to strike while performing one or more tasks in order to minimize one or more costs. In various implementations, a "reference" path that may be traversed by an end effector of a robot (and more particularly, a reference point of the end effector), may be determined. Multiple sets of poses that can be struck by the robot while traversing the end effector along the reference path may be determined. In some implementations, a cost that would be incurred by one or more operational components (e.g., joints, actuators, springs, etc.) of the robot to strike each set of poses may be calculated. In some implementations, an average cost that would be incurred across multiple operational components may be calculated. Based on the calculated costs, a set of poses may be selected that satisfies a criterion, such as a minimum (or acceptable) cost incurred by a particular operational component. Additionally, in some implementations, multiple "candidate paths" may be examined, each in the same manner as a reference path, to determine which candidate path best satisfies a criterion.

Selecting sets of poses for a robot to strike while performing a task provides various technical advantages. For example, if a particular set of poses that the robot can strike while performing a task imparts less costs (e.g., wear and tear on one or more operational components, excessive motion) than other sets of poses, then utilizing that set of poses, especially when repeating the task over and over again, may reduce costs and/or robot downtime, and may increase efficiency and/or safety.

In some implementations, a computer implemented method may be provided that includes the steps of: determining, by one or more processors, a reference path between a sequence of two or more sites that is traversable by a reference point associated with an end effector of a robot; determining, by the one or more processors, a plurality of candidate instruction sets, each candidate instruction set configured to cause the robot to assume a different respective set of poses while traversing the reference point along the reference path; calculating, by the one or more processors for one or more of the plurality of candidate instruction sets, a cost that would be incurred while the robot implements the candidate instruction set to traverse the reference point along the reference path; and selecting, by the one or more processors from the plurality of candidate instruction sets, a candidate instruction set associated with a calculated cost that satisfies a criterion.

This method and other implementations of technology disclosed herein may each optionally include one or more of the following features.

In some implementations, determining the reference path may include receiving, by the one or more processors via a graphical user interface, an indication of the reference path. In some implementations, determining the reference path may include receiving, by the one or more processors, an indication of the reference path recorded by the robot while the robot is manually manipulated along the reference path. In some implementations, determining the reference path may include calculating, by the one or more processors based on input from an environmental detection device, an indication of the reference path.

In some implementations, the criterion is a minimum calculated cost. In some implementations, the cost that would be incurred while the robot implements the candidate instruction set may include excessive motion or overlong execution by the robot. In some implementations, the cost that would be incurred while the robot implements the candidate instruction set may include a cost that would be incurred by a particular operational component of the robot. In some implementations, the particular operational component comprises a plurality of operational components, and the cost calculated for each of the plurality of candidate instruction sets comprises an average calculated cost incurred across the plurality of operational components. In some implementations, the criterion is a minimum average calculated cost. In some implementations, the particular operational component of the robot comprises an actuator or joint of the robot. In some implementations, calculating the cost includes calculating a measure of motion or torque implemented by the actuator or joint during traversal of the reference point along the reference path, calculating a measure of proximity of the actuator or joint to an associated actuator or joint operational limit during traversal of the reference point along a reference path, and/or calculating a measure of proximity of the actuator or joint to a preferred actuator or joint configuration during traversal of the reference point along a reference path.

In some implementations, traversing the reference point along the reference path causes the end effector to be in a first configuration at a given site of the sequence of two or more sites, the plurality of candidate instruction sets may include a first plurality of candidate instruction sets, and the method may further include: determining, by the one or more processors, a potential second configuration of the end effector at the given site, the second configuration being different than the first configuration; determining, by the one or more processors, an alternative path between to the given site that is traversable by the reference point and that results in the end effector being in the second configuration; determining, by the one or more processors, a second plurality of candidate instruction sets, each candidate instruction set of the second plurality of candidate instruction sets configured to cause the robot to assume a different respective set of poses while traversing the reference point along the alternative path; calculating, by the one or more processors for each of the second plurality of candidate instruction sets, a cost that would be incurred by the particular operational component of the robot while implementing the candidate instruction set to traverse the reference point along the alternative path; and selecting, by the one or more processors from the first and second pluralities of candidate instruction sets, a candidate instruction set associated with a calculated cost that satisfies the criterion.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
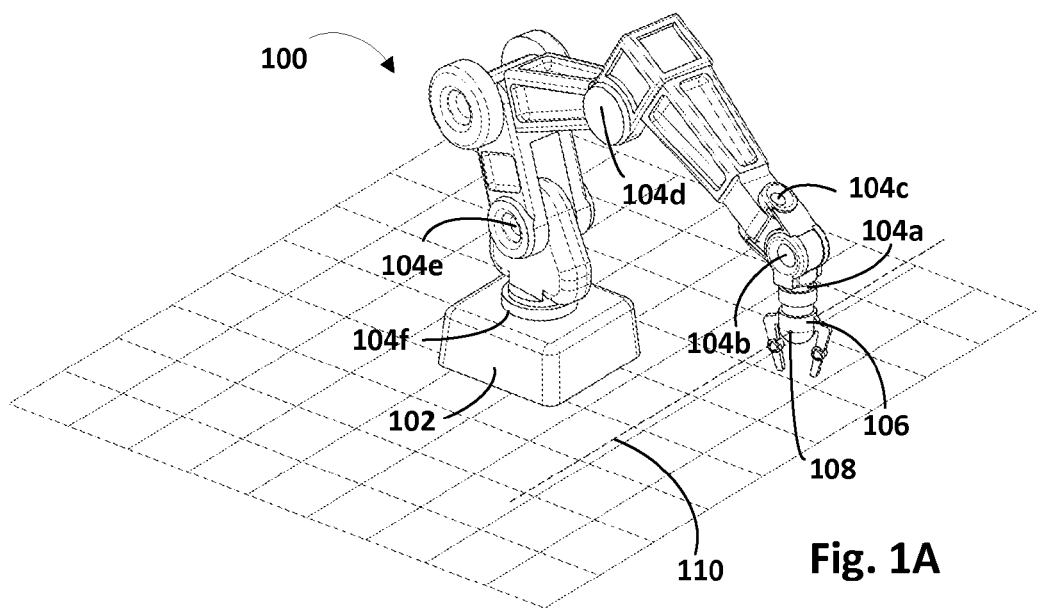
FIGS. 1A-C illustrate an example robot striking different sets of poses while traversing a reference point of an end effector along the same reference path, in accordance with various implementations.

FIG. 1A illustrates an example robot 100 (in a form often referred to as a "robot arm") that includes a base 102 and a plurality of operational components, six of which are referenced in FIG. 1A with 104a-f. Robot 100 may include other operational components, but those are not labeled in FIG. 1A for the sakes of clarity and brevity. As used herein, an "operational component" of a robot may refer to actuators, motors (e.g., servo motors), joints, shafts, gear trains, pumps (e.g., air or liquid), pistons, drives, or other components that may create and/or undergo propulsion, rotation, and/or motion. Some operational components may be independently controllable, although this is not required. In some instances, the more operational components robot 100 has, the more degrees of freedom of movement it may have.

Robot 100 also includes an end effector 106. As used herein, "end effector" may refer to a variety of tools that may be operated by robot 100 in order to accomplish various tasks. In FIGS. 1-3, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contiguitive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

End effector 106 may define an abstract reference point 108. Reference point 108 may be a point of end effector 106 that traverses a particular path when robot 100 moves between sites. In some implementations, reference point 108 may be a center of gravity of end effector 106, and/or a point near where end effector 108 attaches to robot 100, though this is not required. Robots typically, and robot 100 in particular, may have multiple degrees of freedom of movement. Accordingly, and as noted in the background, it is possible for robot 100 to traverse reference point 108 of end effector 106 along the same path in multiple ways, each time striking a different set of poses. As used herein, a "pose" refers to a particular configuration of components of robot relative to one another at a particular moment in time (e.g., a "snapshot"). When robot 100 is inactive, it may be in (or "strike") a single pose until it moves again. When robot 100 moves, it may strike a series of poses to effectuate the movement.

As noted in the background, a variety of costs may be incurred as a result of robot 100 striking different sets of poses while traversing reference point 108 of end effector 106 along a path. In some implementations, measures of motion, velocity, and/or torque experienced and/or imparted by operational components 104 of robot 100 may be used as proxies for these various costs. For example, the more motion, velocity, and/or torque imparted and/or experienced by an operational component 104 such as a joint or actuator, the more wear and tear may be experienced by that operational component 104. As another example, the more motion, velocity, and/or torque imparted and/or experienced by one or more operational components 104, the longer a path may be in actuator space, which in turn may increase the overall robot task execution time. As yet another example, the more motion, velocity, and/or torque imparted and/or experienced by multiple operational components 104, particularly in a confined space, the higher the likelihood of an undesired collision between robot 100 and an obstacle (such as a person) due to excessive robot motion. Other measures may be used as proxies for costs as well, including but not limited to measures of proximity (or "distance") of operational components 104 to their specific operational limits, one or more manipulability measures, measures of proximity (or distance) of operational components 104 to preferred or desired configurations, and so forth.

As an example, suppose robot 100 strikes a first set of poses while traversing reference point 108 along a path. One operational component 104a may experience and/or cause a first measure of motion, velocity, and/or torque, and a second operational component 104b may experience and/or cause a second measure of motion, velocity, and/or torque. By contrast, if robot 100 strikes a second set of poses while traversing reference point 108 along the same path, operational component 104a may experience and/or cause a third measure of motion, velocity, and/or torque that is greater than the first measure of motion/torque, and second operational component 104b may experience and/or cause a fourth measure of motion/velocity/torque that is less than the second measure of motion/velocity/torque. If, for instance, second operational component 104b is more expensive to replace than first operational component 104a, then it may be preferable for robot 100 to strike the second set of poses rather than the first set while traversing reference point 108 along the path, especially over a large number of repetitions, to extend the useful life of second operational component 104b.

Accordingly, in various implementations, a plurality of candidate sets of poses that may be assumed (or "struck") by robot 100 while it traverses reference point 108 along a path may be determined. Then, for one or more of the plurality of candidate sets of poses, a cost that would be incurred while robot 100 assumes the set of poses to traverse reference point 108 along the path may be calculated. For example, a cost that would be incurred by one or more operational components 104 while robot 100 assumes the set of poses to traverse reference point 108 along the path may be calculated. Finally, in some implementations, a candidate set of poses associated with a calculated cost that satisfies a criterion may be selected from the plurality of candidate sets of poses. For example, in some implementations, the candidate set of poses that would cause the least wear and tear on a particular operational component may be selected. In other implementations, the first candidate set of poses calculated to cause an acceptable amount of wear and tear on the particular operational component 104 may be selected. In this manner, it is possible to select how robot 100 moves end effector 106 (and more particularly, reference point 108) along a path to extend lifetime(s) of one or more operational components 104 and/or to reduce other costs.

A reference path between locations, or "sites," that is traversed by a reference point 108 of an end effector 106 may be defined in various ways. In some implementations, a user may manually manipulate robot 100 to move end effector 106 along one reference path between a sequence of two or more sites while robot 100 continuously records its path (e.g., by continuously recording coordinates of its various components and parts). As another example, an environmental detection device (not depicted) such as a camera (e.g., a three-dimensional camera), laser range finder, a radar sensor, or any other sensor that can provide a measure of the environment, may detect a reference path between the sequence of sites, e.g., taking into account various constraints such as obstacles in or near the path. As yet another example, a user may operate a graphical user interface ("GUI") to provide an indication of a reference path between the sequence of sites, e.g., by defining a series of waypoints.

However the reference path is defined, a plurality of candidate "instruction sets," each executable by robot 100 to cause it to assume (or "strike") a different respective set of poses while traversing the reference point along the reference path, may be calculated. As used herein, an "instruction set" may be a set of instructions (e.g., commands, machine code instructions, motion primitives, etc.) that are executable by a robot (e.g., robot 100) to perform one or more actions. Next, those candidate instruction sets may be analyzed to determine what effect they would have on a cost while robot 100 traverses reference point 108 along the reference path. If the goal is to maximize the lifetime of a single component 104, then the candidate instruction set that would yield the lowest cost incurred by that component 104 may be selected. If the goal is to maximize an average lifetime of a plurality of components 104, then the candidate instruction set that would yield the lowest average cost across those components 104 may be selected.

In some implementations, a "brute force" approach may be utilized to identify candidate instruction sets that achieve high level task descriptions in view of various constraints, and to select one or more of the candidate instruction sets based on various criteria, such as minimizing one or more cost functions. For example, a thousand different candidate instruction sets may be determined that satisfactorily cause robot 100 to traverse reference point 108 of end effector 106 along a reference path. One of those candidate instruction sets may then be selected based on it causing the "least amount" of robot joint motion.

A "cost" incurred by one or more operational components 104 when robot 100 performs a particular task may be calculated in various ways. As noted above, force, velocity, and/or motion experienced and/or imparted by one or more operational components 104 may be used as a proxy for cost, with the assumption being the more force/motion imparted/experienced by the component(s), the cost incurred. The motion/force imparted/experienced by an operational component 104 when robot 100 performs a particular task may depend on a variety of factors. For example, force such as torque exerted by/on an operational component 104 such as a motor or joint may be influenced by the weight of an object being carried by robot 100, as well as a manner in which robot 100 carries the object. Lifting an object from a first angle may distribute weight of the object across more operational components 104 of robot 100 than lifting the object from a second angle. As additional examples, force/motion exerted by/on an operational component 104 may also depend on one or more weights of one or more other components of robot 100, positions of those other components of robot 100 relative to the operational component 104 in question during various robot poses, and/or durations of those various robot poses.

Figure 1B:
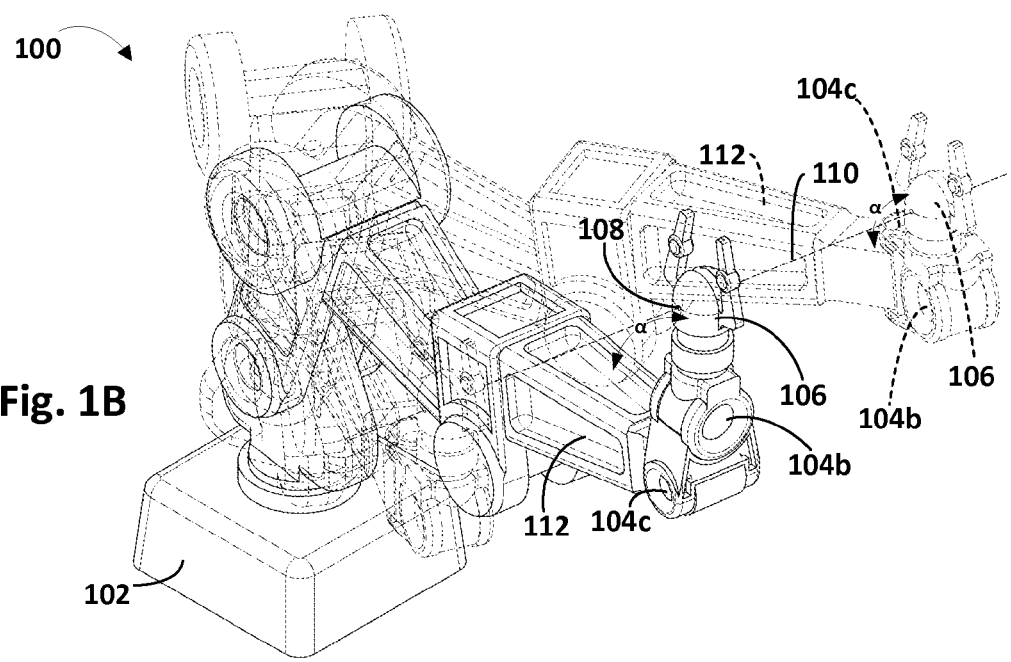

FIGS. 1B and C depict two examples of sets of poses that may be struck by robot 100 while traversing reference point 108 of end effector 106 along a reference path 110. In FIG. 1B, robot 100 traverses reference point 108 of end effector 106 along path 110 by extending end effector 106 into path 110 from below (e.g., "underhanded"). As can be seen, path 110 is farther from base 102 of robot 100 at the respective ends of path 110 than near its middle, when path 110 passes closest to base 102. Thus, while traversing reference point 108 along path 110 as shown in FIG. 1B, robot 100 strikes a first series of poses to maintain a central angle α formed between end effector 106 and arm portion 112. For example, and as shown by the phantom and non-phantom images, second operational component 104b rotates, and is itself rotated, to maintain reference point 108 on path 110. Other operational components 104 of robot 100 may also need to vary their configurations in order to maintain reference point 108 along path 110, as is demonstrated by the phantom images in FIG. 1B.

Figure 1C:
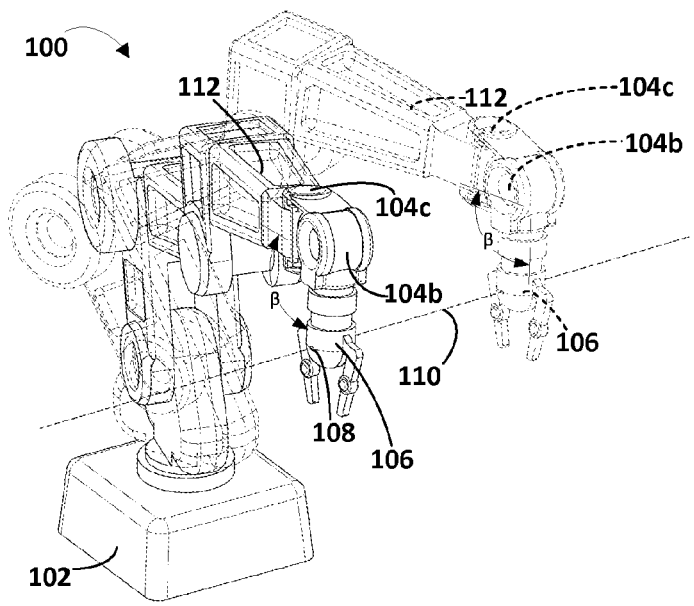

In FIG. 1C, robot 100 traverses reference point 108 of end effector 106 along path 110 in a different manner than in FIG. 1B, this time extending end effector 106 into path 110 from above (e.g., "overhanded"). Once again, to traverse reference point 108 along path 110 as shown in FIG. 1C, robot 100 strikes a series of poses in which a central angle β between end effector 106 and arm portion 112 is maintained while reference point 108 is traversed along path 110. As was the case with FIG. 1B, path 110 is farther from base 102 of robot 100 at the respective ends of path 110 than near its middle, when path 110 passes closest to base 102. Thus, and as shown by the phantom images, robot 100 strikes a second, different series of poses to maintain reference point 108 on path 110. Various operational components 104 of robot 100 may vary their configurations in various ways in order for robot 100 to strike this alternative series of poses, as is demonstrated by the phantom image in FIG. 1C.

Traversing reference point 108 along path 110 using the different sets of poses shown in FIGS. 1B and 1C, respectively, may cause various amounts of cost (e.g., wear and tear, excessive motion, overlong execution) to be incurred. In various implementations, these varying costs may be taken into consideration when selecting an instruction set (corresponding to a set of poses) for robot 100 to execute. For example, if a first set of poses causes less wear and tear to a particular operational component 104 of interest than a second set, or if the first set of poses causes less average cost across multiple operational components 104 than the second set, than an instruction set that causes robot 100 to strike the first set of poses may be selected for implementation.

Figure 2A:
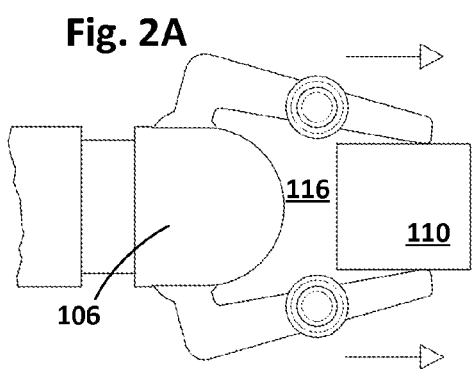
FIGS. 2A-B illustrate how an example robot end effector may act upon an object while in two different configurations, in accordance with various implementations.
Figure 2B:
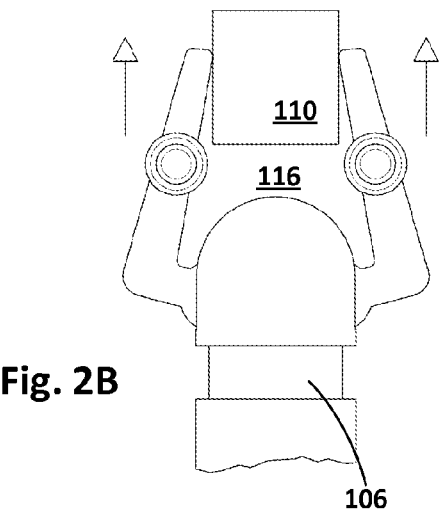

FIGS. 2A and 2B are views from above looking down at a site 116 an object 118, which is to be acted upon (e.g., picked up) by robot 100 (only end effector 106 is visible in FIGS. 2A and 2B), resting on a plane. In various scenarios, robot 100 may maneuver end effector 106 towards object 118 from multiple angles. For example, in FIG. 2A, end effector 106 is maneuvered towards object 118 from the left. In FIG. 2B, by contrast, end effector 106 is maneuvered towards object 118 from below. Depending on the circumstances, either approach may be acceptable. Other un-depicted approaches may also be acceptable. Suppose that object 118 is not fragile and that it does not matter if an orientation of object 118 is changed during its travels. It may be acceptable for end effector 106 to be placed in either of the configurations shown in FIG. 2A or 2B to pick up object 118. It may also be acceptable for end effector 106 to pick up object from above, or from various intermediate angles.

To maneuver end effector 106 to the configurations depicted in FIGS. 2A and 2B to pick up object 118, as well as to maneuver end effector 106 to other, un-depicted configurations to pick up object 118 (e.g., from above), reference point 108 of end effector 106 may traverse different paths, also referred to as "candidate" paths. As was the case for the reference path 110 described above, robot 100 may strike a different set of poses for each candidate path. Accordingly, in various implementations, a plurality of candidate instruction sets may be determined for each candidate path. Similar to above, each candidate instruction set of each plurality of candidate instruction sets may be configured to cause robot 100 to strike a different respective set of poses while traversing reference point 108 along a particular candidate path. A cost that would be incurred while implementing each candidate instruction set of each plurality of candidate instruction sets may be calculated. Then, for each candidate path, a candidate instruction set associated with a calculated cost that satisfies one or more criteria may be selected.

Figure 3A:
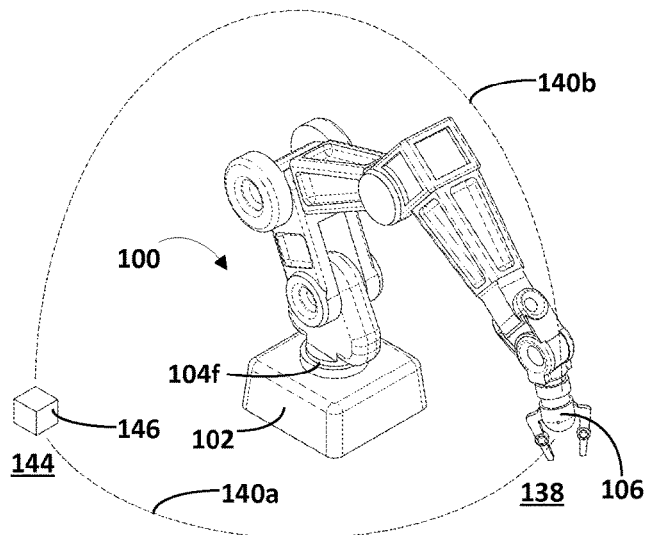
FIGS. 3A-C illustrate an example robot traversing a reference point of an end effector along different paths, in accordance with various implementations.
Figure 3B:
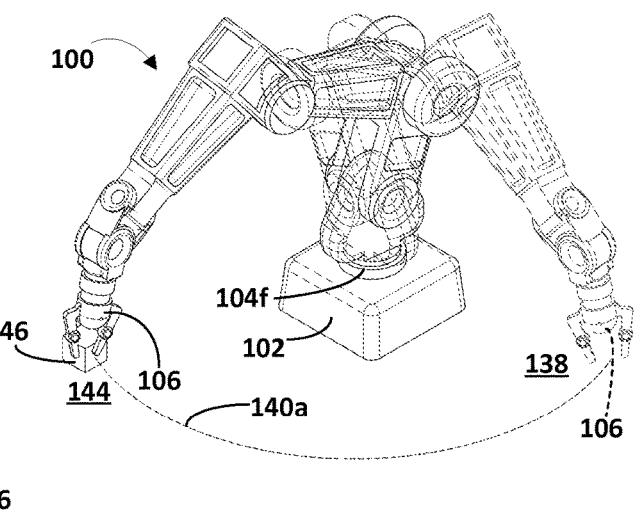
Figure 3C:
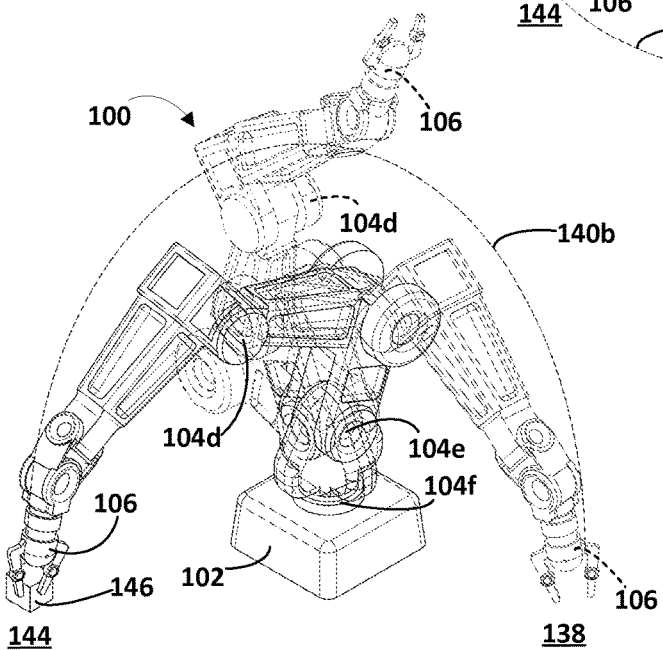

FIGS. 3A-C depict an example of how robot 100 may maneuver end effector 106 along multiple candidate paths 140a-b to multiple acceptable configurations at a destination site 144 of an object 146 to be acted upon. FIG. 3A depicts robot 100 at its starting position, with end effector 106 positioned at a starting site 138. Two candidate paths 140a and 140b to destination site 144 are depicted in dashed lines. First candidate path 140a circumnavigates around base 102 of robot 100. Second candidate path 140b forms an arc above robot 100.

FIG. 3B depicts robot 100 traversing end effector 106 along first candidate path 140a. As demonstrated by the phantom image of robot 100, the operational component 104 of robot 100 that does most of the work is sixth operational component 104f near base 102. Sixth operational component 104f rotates all of robot 100 above base 102 clockwise, so that end effector 106 traverses first candidate path 140a and approaches destination site 144 and object 146 from one side. Most other operational components 104 of robot 100 impart and/or experience little or no movement or force.

FIG. 3C depicts robot 100 traversing end effector 106 along second candidate path 140b. As demonstrated by the phantom images of robot 100 at various intervals, several operational components 104 of robot 100 impart and/or experience movement or force in order for robot 100 to traverse end effector 106 towards destination site 144 and object 146 from above. Notably, in FIG. 3C, sixth operational component 104f near base 102 imparts and/or experiences little or no rotation. Accordingly, if it is preferable to minimize wear and tear on sixth operational component 104f, then second candidate path 140b may be selected for implementation by robot 100. By contrast, if it is preferable to minimize wear and tear across other operational components (e.g., 104d, 104e), rather than sixth operational component 104f, then first candidate path 140a may be selected for implementation by robot 100. In some implementations, a cost associated with each candidate path 140a, 140b may be determined by analyzing a plurality of sets of poses (and corresponding instruction sets) that robot 100 may strike while traversing end effector 106 along that candidate path. For example, the instruction set (and corresponding set of poses) that imparts the lowest cost (or the first instruction set calculated to impart an acceptable cost) on one or more selected operational components 104 may be selected as the cost for that candidate path.

Figure 4:
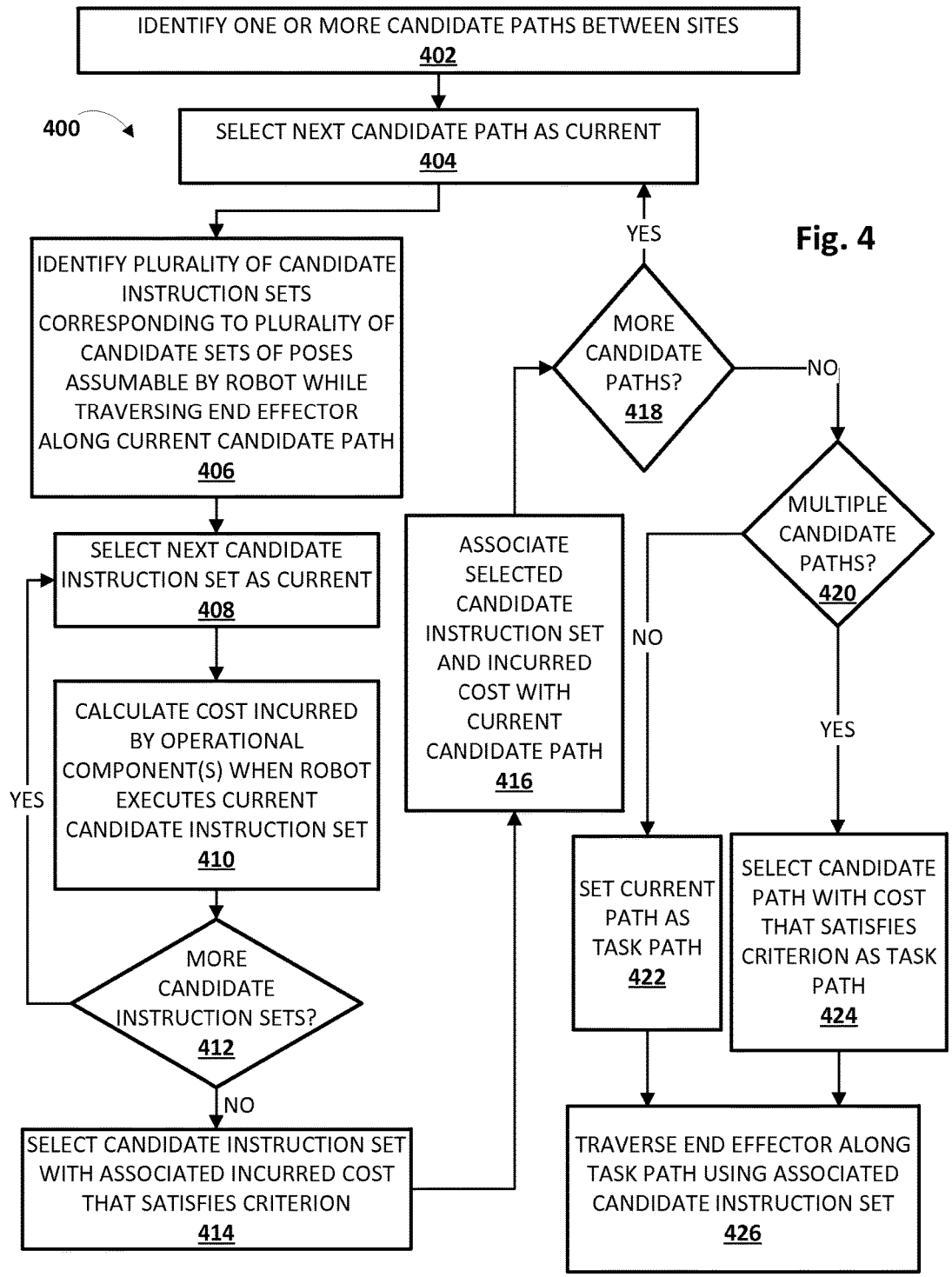
FIG. 4 depicts a flow chart illustrating an example method of selecting robot paths and poses to account for costs, in accordance with various implementations.

Referring now to FIG. 4, an example method 400 of selecting a candidate instruction set that is executable by robot 100 to traverse reference point 108 of end effector 106 along a selected candidate path is described. For convenience, the operations of the flow chart are described with reference to a system that performs the operations. This system may include various components of various computer systems, including computing elements of robot 100 and/or computing systems remote from robot 100, such as control system 560 in FIG. 5. Moreover, while operations of method 400 are shown in a particular order, this is not meant to be limiting. One or more operations may be reordered, omitted or added.

At block 402, the system may identify one or more candidate paths traversable by a reference point of a robot end effector between a pair of sites. For example, the system may identify candidate paths 140a and 140b depicted in FIGS. 3A-C. At block 404, the system may select one of the identified candidate paths as a "current" path for analysis. At block 406, the system may determine a plurality of candidate instruction sets that will cause the robot to strike a corresponding plurality of candidate sets of poses while traversing its end effector reference point along the current candidate path.

At block 408, the system may select one of the candidate instruction sets identified at block 406 as a "current" candidate instruction set for analysis. At block 410, the system may calculate a cost incurred by one or more operational components of the robot when the robot executes the current candidate instruction set. As noted above, calculation of these costs may take into account a variety of factors, such as one or more weights of one or more other portions of robot, a weight of an object to be carried (if applicable for the task), relative positions of various components of the robot during various poses that would be struck by the robot when executing the current candidate instruction set, duration of those various poses, and so forth.

After the cost of the current candidate instruction set is calculated at block 410, at block 412, the system may determine whether there are more candidate instruction sets for which costs have not yet been calculated. If the answer is yes, method 400 may proceed back to block 408, the next candidate instruction set may be selected as the "current" candidate instruction set, and blocks 410412 may be repeated. If the answer at block 412 is no, however, then method 400 may proceed to block 414.

At block 414, the system may select a candidate instruction set of the plurality of candidate instruction sets identified at block 406 that has an associated incurred cost (calculated at block 410) that satisfies some criterion. In some implementations, the criterion may be a minimum calculated cost among the plurality of candidate instruction sets. At block 416, the system may associate the candidate instruction set selected at block 414, as well as its associated calculated cost, with the "current" candidate path (which was selected back at block 404).

At block 418, the system may determine whether there are more candidate paths for which costs have not yet been calculated. If the answer is yes, method 400 may proceed back to block 404, the next candidate path may be selected as the "current" path, and blocks 406416 may be repeated. If the answer at block 418 is no, however, then method 400 may proceed to block 420.

At block 420, the system may check whether there were multiple candidate paths. If the answer is no, then method may proceed to block 422, and the "current" path may be set as a so-called "task" path. The "task" path as used herein will be the path that is ultimately traversed by the end effector reference point of the robot. Method 400 may proceed through block 422 in the situation where a user selects a single reference path, and then the system calculates, and selects from, a plurality of candidate instruction sets executable by the robot to traverse the end effector reference point along the reference path. If the answer at block 420 is yes, however, then at block 424 the system may select, as the task path from a plurality of candidate paths identified at block 402, the candidate path with an associated cost (determined at block 416) that satisfies some criterion. In some implementations, the criterion in this instance may be the candidate path having the lowest associated cost. At block 426, the robot may execute the candidate instruction set associated with the task path to traverse the end effector reference point along the task path.

Figure 5:
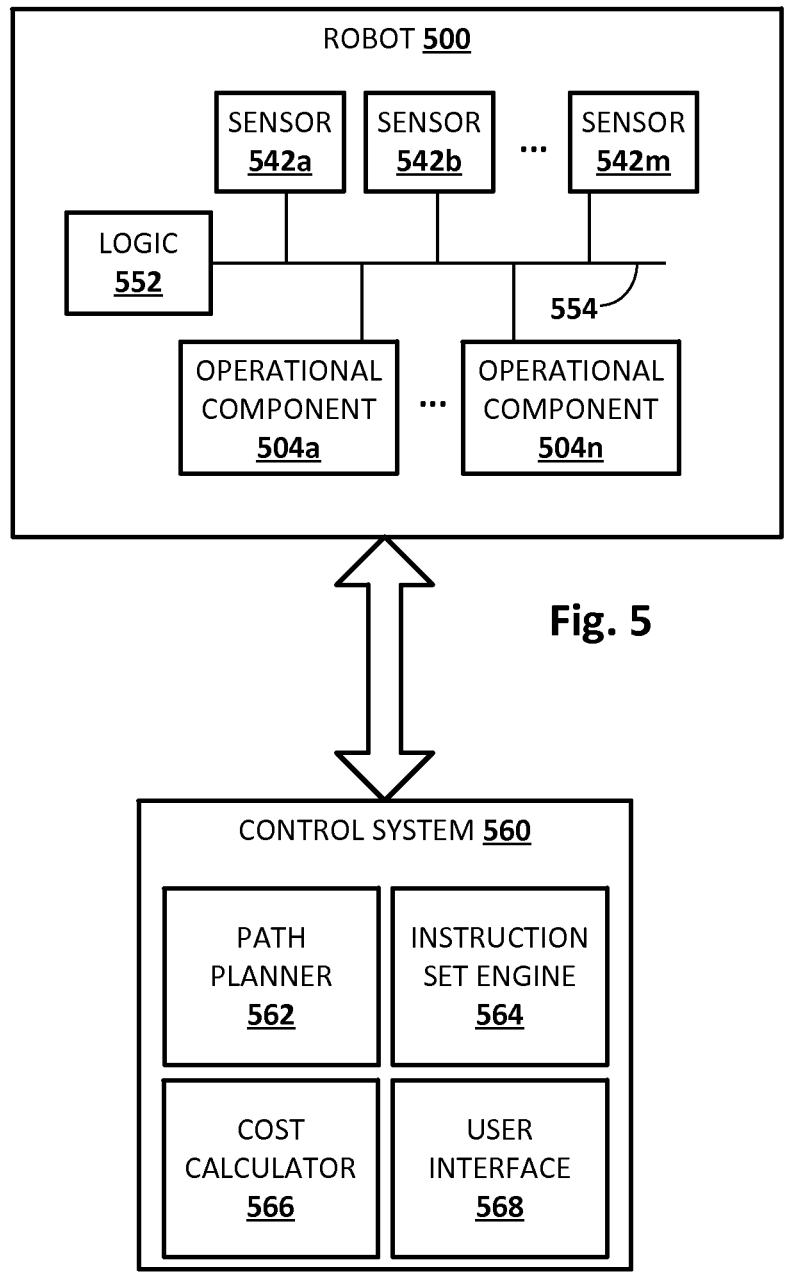
FIG. 5 schematically depicts an example environment in which disclosed techniques may be implemented.

FIG. 5 is a schematic diagram of an example environment in which selected aspects of the present disclosure may be implemented. A robot 500 may be in communication with a control system 560. Robot 500 may take various forms, including but not limited to a robot arm similar to robot 100 described above, a humanoid form, an animal form, a wheeled device, a submersible vehicle, an unmanned aerial vehicle ("UAV"), and so forth. In various implementations, robot 500 may include logic 552. Logic 552 may take various forms, such as one or more processors, one or more field-programmable gate arrays ("FPGA"), one or more application-specific integrated circuits ("ASIC"), one or more so-called "real time controllers," and so forth.

In various implementations, logic 552 may be operably coupled with one or more operational components 504a-n and/or one or more sensors 542a-m, e.g., via one or more buses 554. Sensors 542 may take various forms, including but not limited to light sensors, pressure sensors, pressure wave sensors (e.g., microphones), proximity sensors, accelerometers, gyroscopes, thermometers, barometers, and so forth. While sensors 542a-m are depicted as being integral with robot 500, this is not meant to be limiting. In some implementations, sensors 542 may be located external to robot 500, e.g., as standalone units or as part of control system 560.

Control system 560 may include one or computing systems connected by one or more networks (not depicted) that control operation of robot 500 to various degrees. An example of such a computing system is depicted schematically in FIG. 6. In some implementations, control system 560 exerts a relatively high level of control over robot 500, e.g., in real time in response to signals received at a user interface 568 and/or one or more readings from one or more sensors 542. In other implementations, control system 560 exerts less direct control over robot 500. For example, control system 560 may provide robot 500 with high level tasks (e.g., "pick up object", "place object in processing machine"), data indicative of one or more obstacles to avoid, and/or other general constraints that robot 500 may be unable to ascertain itself by processing signals from sensors 542. Logic 552 on robot 500 may convert such high level commands and other data into robot action, e.g., by translating one or more high level tasks into a plurality of motion primitives executable by robot 500. In some implementations, this translation of high level tasks or commands into low level motion primitives may take into account various costs incurred by various operational components 504 of robot 500, e.g., by using disclosed techniques.

Various modules or engines may be implemented as part of control system 560 as software, hardware, or any combination of the two. For example, in FIG. 5, control system 560 includes a path planner 562, an instruction set engine 564, and a cost calculator 566. Path planner 562 may be configured to identify a plurality of candidate paths traversable by a reference point of robot 500 to accomplish one or more tasks, e.g., as described above at block 402 of FIG. 4. In some implementations, path planner 562 may be further configured to select, from the plurality of candidate paths, one or more "task" paths to be traversed by robot 500 in performing a task, as described above at blocks 422 and 424 of FIG. 4. To select one or more task paths, path planner 562 may take into consideration various signals, such as signals indicative of obstacles (both stationary and dynamic) within an environment in which robot 500 operates, signals indicative of one or more capabilities of robot 500 (which may change over time, for instance, based on power drain and/or wear and tear), signals about costs incurred by various operational components of robot 500 (e.g., as provided by cost calculator 566), and so forth.

In various implementations, instruction set engine 564 may be configured to generate, for each candidate path, a plurality of instruction sets, each instruction set executable by robot 500 to traverse an end effector reference point of robot 500 along the candidate path. In some implementations, instruction set engine 564 may be configured to select "most suitable" and/or "good enough" instruction sets configured to cause robot 500 to strike a plurality of respective sets of poses while traversing an end effector along a path, as described above. In various implementations, cost calculator 566 may be configured to calculate costs associated with robot 500 executing instruction sets generated or selected by instruction set engine 564, e.g., as described above with respect to block 410.

A user interface 568 may be provided that facilitates user input of various commands or tasks for robot 500. In some implementations, user interface 568 may be provided as a graphical user interface rendered on a mobile computing system such as a smart phone or tablet. A user may operate the graphical user interface to control robot 500 to various degrees. For example, to define a reference path as described above, a user may operate user interface 568 to define one or more waypoints on a three-dimensional rendering of an environment in which robot 500 operates. In some implementations, user interface 568 may be operable by a user to cause robot 500 to enter a "training" mode in which the user may manually manipulate one or more operational components or robot 500 (e.g., end effector 106) along one or more paths, all while robot 500 continuously and/or periodically records its coordinates.

While robot 500 and control system 560 are depicted separately in FIG. 5, this is not meant to be limiting. In various implementations, one or more aspects (e.g., modules, engines, user interface 568, etc.) depicted in FIG. 5 as implemented on one of robot 500 or control system 560 may be implemented on the other, may be distributed across both, and/or may be distributed across one or both in combination with other components not depicted in FIG. 5. In implementations where robot 500 and control system 560 are separate, they may communicate over one or more wired or wireless networks (not depicted) or using other wireless technology, such as radio, Bluetooth, infrared, etc. In other implementations, control system 560 may be implemented entirely or in part using logic 552 of robot 500.

Figure 6:
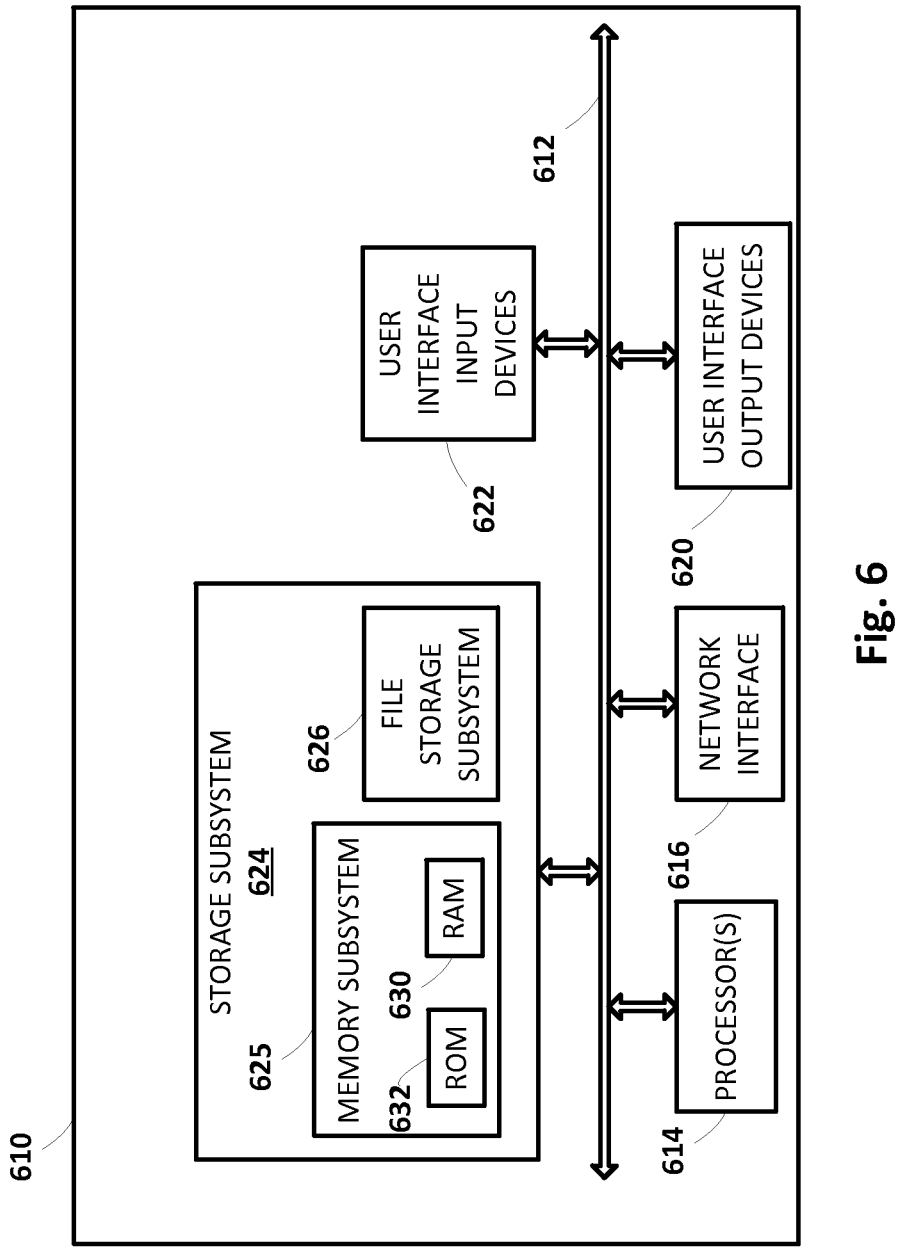
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, and/or to implement one or more aspects of logic 552, path planner 562, instruction set engine 564, cost calculator 566, and/or user interface 568. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
defining, by one or more processors, a reference path in Cartesian space between a sequence of two or more sites that is traversable by a reference point associated with an end effector of a robot;
determining, by the one or more processors, a plurality of candidate instruction sets, each candidate instruction set configured to cause the robot to assume a different respective sequence of poses in joint space while traversing the reference point along the reference path in Cartesian space, wherein each candidate instruction set is implementable by the robot to operate one or more operational components of the robot in joint space;

calculating, by the one or more processors for one or more of the plurality of candidate instruction sets, a cost that would be incurred while the robot implements the candidate instruction set to traverse the reference point along the reference path;

selecting, by the one or more processors from the plurality of candidate instruction sets, a candidate instruction set associated with a calculated cost that satisfies a criterion; and causing, by the one or more processors, the robot to implement the selected candidate instruction set to traverse the reference point along the reference path through the two or more sites.

2. The computer-implemented method of claim 1, wherein determining the reference path comprises receiving, by the one or more processors via a graphical user interface, an indication of the reference path.

3. The computer-implemented method of claim 1, wherein determining the reference path comprises receiving, by the one or more processors, an indication of the reference path recorded by the robot while the robot is manually manipulated along the reference path.

4. The computer-implemented method of claim 1, wherein determining the reference path comprises calculating, by the one or more processors based on input from an environmental detection device, an indication of the reference path.

5. The computer-implemented method of claim 1, wherein the criterion is a minimum calculated cost.

6. The computer-implemented method of claim 1, wherein the cost that would be incurred while the robot implements the candidate instruction set comprises excessive motion or overlong execution by the robot.

7. The computer-implemented method of claim 1, wherein the cost that would be incurred while the robot implements the candidate instruction set comprises a cost that would be incurred by a particular operational component of the robot.

8. The computer-implemented method of claim 7, wherein traversing the reference point along the reference path causes the end effector to be in a first configuration at a given site of the sequence of two or more sites, the plurality of candidate instruction sets comprises a first plurality of candidate instruction sets, and the method further comprises:

determining, by the one or more processors, a potential second configuration of the end effector at the given site, the second configuration being different than the first configuration;

determining, by the one or more processors, an alternative path in Cartesian space to the given site that is traversable by the reference point and that results in the end effector being in the second configuration;

determining, by the one or more processors, a second plurality of candidate instruction sets, each candidate instruction set of the second plurality of candidate instruction sets configured to cause the robot to assume a different respective sequence of poses in joint space while traversing the reference point along the alternative path in Cartesian space;

calculating, by the one or more processors for each of the second plurality of candidate instruction sets, a cost that would be incurred by the particular operational component of the robot while implementing the candidate instruction set to traverse the reference point along the alternative path; and selecting, by the one or more processors from the first and second pluralities of candidate instruction sets, a candidate instruction set associated with a calculated cost that satisfies the criterion.

9. The computer-implemented method of claim 7, wherein the particular operational component comprises a plurality of operational components, and the cost calculated for each of the plurality of candidate instruction sets comprises an average calculated cost incurred across the plurality of operational components.

10. The computer-implemented method of claim 9, wherein the criterion is a minimum average calculated cost.

11. The computer-implemented method of claim 7, wherein the particular operational component of the robot comprises an actuator or joint of the robot.

12. The computer-implemented method of claim 11, wherein calculating the cost includes calculating a measure of motion or torque implemented by the actuator or joint during traversal of the reference point along the reference path.

13. The computer-implemented method of claim 11, wherein calculating the cost includes calculating a measure of proximity of the actuator or joint to an associated actuator or joint operational limit during traversal of the reference point along a reference path.

14. The computer-implemented method of claim 11, wherein calculating the cost includes calculating a measure of proximity of the actuator or joint to a preferred actuator or joint configuration during traversal of the reference point along a reference path.

15. At least one non-transitory computer-readable medium comprising instructions that, in response to execution of the instructions by a computing system, cause the computing system to perform the following operations:

defining a plurality of candidate paths in Cartesian space between a sequence of two or more sites that are traversable by a reference point associated with an end effector of a robot;

for one or more of the plurality of candidate paths:
determining a plurality of candidate instruction sets, each candidate instruction set configured to cause the robot to assume a different respective sequence of poses in joint space while traversing the reference point along the candidate path in Cartesian space, wherein each candidate instruction set is implementable by the robot to operate one or more operational components of the robot in joint space;

calculating, for one or more of the plurality of candidate instruction sets, a cost that would be incurred by a particular operational component of the robot while implementing the candidate instruction set to traverse the reference point along the candidate path;

selecting, from the plurality of candidate instruction sets, a candidate instruction set associated with an associated incurred cost that satisfies a first criterion;

associating the selected candidate instruction set and incurred cost with the candidate path;

selecting, as a task path from the plurality of candidate paths, a candidate path associated with an incurred cost that satisfies a second criterion; and causing the robot to traverse the reference point along the task path.

16. A system comprising one or more processors and memory operably coupled with the one or more processors, wherein the memory stores instructions that, in response to execution of the instructions by one or more processors, cause the one or more processors to:

define a reference path in Cartesian space between a sequence of two or more sites that is traversable by a reference point associated with an end effector of a robot;

determine a plurality of candidate instruction sets, each candidate instruction set configured to cause the robot to assume a different respective sequence of poses in joint space while traversing the reference point along the reference path in Cartesian space, wherein each candidate instruction set is implementable by the robot to operate one or more operational components of the robot in joint space;

calculate, for one or more of the plurality of candidate instruction sets, a cost that would be incurred while the robot implements the candidate instruction set to traverse the reference point along the reference path;

select, from the plurality of candidate instruction sets, a candidate instruction set associated with a calculated cost that satisfies a criterion; and cause the robot to implement the selected candidate instruction set to traverse the reference point along the reference path through the two or more sites.

17. The system of claim 16, further comprising instructions to receive, via a graphical user interface, an indication of the reference path.

18. The system of claim 16, further comprising instructions to receive an indication of the reference path recorded by the robot while the robot is manually manipulated along the reference path.

19. The system of claim 16, further comprising instructions to calculate, based on input from an environmental detection device, an indication of the reference path.

20. The system of claim 16, wherein the criterion is a minimum calculated cost.

21. The system of claim 16, wherein the cost that would be incurred while the robot implements the candidate instruction set comprises excessive motion or overlong execution by the robot.

22. The system of claim 16, wherein the cost that would be incurred while the robot implements the candidate instruction set comprises a cost that would be incurred by a particular operational component of the robot.

23. The system of claim 22, wherein the particular operational component comprises a plurality of operational components, and the cost calculated for each of the plurality of candidate instruction sets comprises an average calculated cost incurred across the plurality of operational components.

* * * * *